United States Patent Office 3,504,897
Patented Apr. 7, 1970

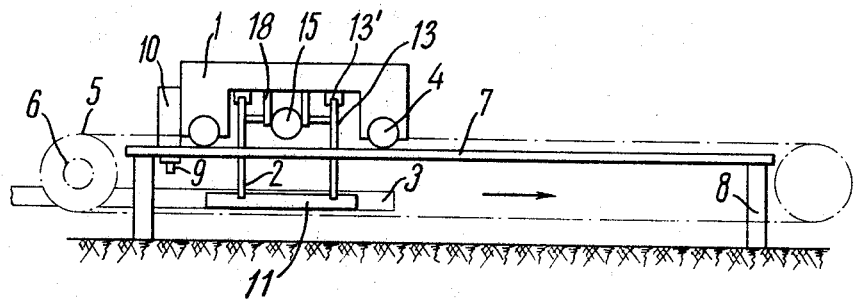
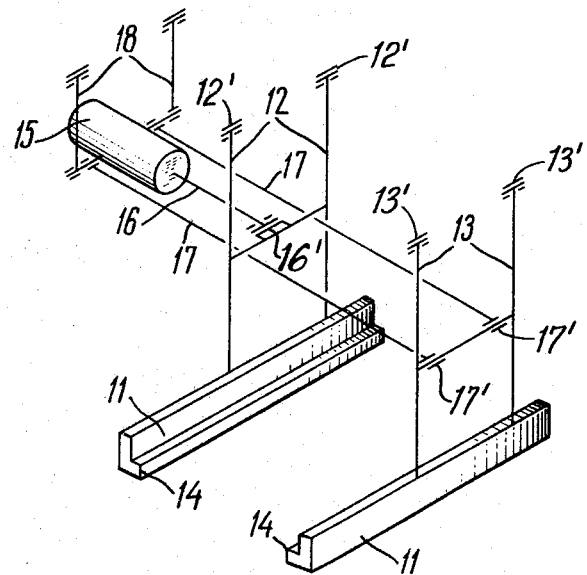
FIG.1
FIG.2

3,504,897
MACHINE FOR GAS CUTTING METAL CONTINUOUSLY MOVING IN THE HORIZONTAL POSITION
Vitaly Maximovich Niskovskikh, Ul. Testivalnaya 21, kv. 60, and Evgeny Jukhimovich Gelfenbein, Ul. 40 let Oktyabrya 28, kv. 51, both of Sverdlovsk, U.S.S.R.
Filed Mar. 6, 1967, Ser. No. 620,949
Int. Cl. B23k 7/02
U.S. Cl. 266—23                    1 Claim

ABSTRACT OF THE DISCLOSURE

A machine for the gas cutting of metal in a horizontal position in which a frame provided with a cutting mechanism is movable along a track with the frame being provided with a self-centering pneumatically operated engagement mechanism. The engagement mechanism includes grips for engaging and retaining the billet during cutting and supporting the cutoff length during movement of the frame following the cutting, and a drive for displacing the frame along the track. The engaging means is provided with a pneumatic cylinder and piston assembly so that movement of the piston rod in one direction causes the gripping means to engage and retain the billet and movement in the opposite direction releases the cutoff length.

The present invention relates to machines for gas cutting metal as it moves in a horizontal position, and more particularly to machines employed in continuous casting plants for cutting metal in a horizontal position.

Machines are known in the art for cutting metal as it travels in a horizontal position, comprising mechanisms for cutting and engaging with a billet being cut, with the mechanisms being provided on a frame displaced by a drive along guides (see the reference edition, "Continuous Casting," by Erhard Hermann, page 435, translated from the German, Moscow, 1961. State Scientific and Technical Publishing House of Literature on the Metallurgy of Ferrous and Non-ferrous Metals).

The existing machines require the provision of special arrangements, such as, roll tables in order to support a billet as it is being cut, and for conveying the cutoff length thereof to the storage location.

The object of the present invention is to provide a machine for cutting metal which cuts the ingot continuously emerging horizontally from a continuous casting plant, and simultaneously supports and conveys the cutoff length to the storage location.

This object is achieved by a machine comprising mechanisms for cutting and engaging a billet being cut, provided on a frame displaced by a drive along guides or rails, and the engaging mechanism being defined by a self-centering lever system freely suspended on the frame, and provided with grips holding the billet during the cutting, and holding the cutoff length thereof during its subsequent conveying to the storage location.

The nature of the present invention will become more fully apparent from a consideration of the following description of an exemplary embodiment thereof, taken in conjunction with the accompanying drawings, in which:

FIG. 1 is a diagrammatic view in side elevation illustrating the present gas cutting machine, and FIG. 2 is a diagrammatic view in perspective illustrating the engaging mechanism and the means for mounting such mechanism on the movable frame and for moving the gripping means into and out of operative relationship with the billet.

The present machine includes a frame provided with a cutting mechanism 9 and a mechanism 2 for engaging a billet 3 to be cut from a continuous ingot. The frame 1 is provided with rollers 4 which run on a track 7 and is displaced axially of the track by a rope or other drive 5 equipped with a suitable clutching means 6. The track 7 is supported by uprights 8.

The cutting mechanism comprises gas-cutting torches 9 that are displaced in a direction normal to the movement of the continuously cast billet 3 by means of a suitable drive 10.

The engaging mechanism 2 comprises two pairs of axially spaced levers 12 and 13, respectively, and the upper ends of the levers are pivotally connected to the frame 1 as shown at 12' and 13' for movement transversely of the longitudinal axis of the frame. A gripping means 11 is carried by the lower ends of each pair of levers 12 and 13, and each gripping means is provided with an inwardly extending horizontal flange or ledge 14. The ledges 14 serve to hold and retain the billet 3 during its cutting and during its movement to a storage location.

A power cylinder 15 which is disposed at right angles to the gripping means is pivotally secured to the frame 1 by means of vertical arms 18. Piston rod 16 of the cylinder 15 is attached as shown at 16' to the levers 12 while horizontal rods 17 connect the cylinder 15 to the levers 13 as denoted 17'.

Since the whole lever system is freely (pivotally) suspended on the frame 1, the displacement of billet from the axis of the machine does not influence its gripping.

The machine operates as follows:

At the beginning of the operation, the machine is engaged with the continuously moving billet 3 by means of the engaging mechanism 2. For this purpose, compressed air is supplied into the working space at one end of the cylinder 15, whereby the levers 12 and 13 are brought together, the billet 3 by the grips 11. The flanges 14 of the grips 11 are thereby disposed under the billet 3, and a support for the latter.

The clutch 6 or the rope drive 5 is disengaged, while the moving billet 3 causes the machine frame to move along the track 7.

The drive 10 is actuated and the torches 9, while moving in a direction normal to the movement of the billets 3, effects the necessary cutting operation. The cutoff length of the billet 9 is retained by the flanges 14 of the grips 11.

The clutch 6 is activated to enable the frame together with the cutoff length of the billet 3 to be displaced by the rope drive 5 to the location where the cutoff lengths are to be stored.

When compressed air is supplied into the space at the opposite end of the cylinder 15, the levers 12 and 13 are thrust apart, thereby releasing the cutoff length of the billet 3, whereupon the machine is returned to its initial position by the drive 5.

Hence, the machine of the present invention allows uniting the operations of cutting, supporting the billet during its cutting, retaining the cutoff length, and conveying it to the storage location, thus eliminating the need of providing special devices so as to reduce considerably the amount of equipment required for the cutting operating in plants for the continuous casting of metal.

What is claimed is:

1. A machine for the gas cutting of metal continuously moving in a horizontal position, comprising a track, a frame movable along the track, a cutting mechanism on the rear portion of the frame, a self-centering pneumatically operated engaging means, said engaging means including two pairs of levers spaced axially of the frame, means pivotally connecting the levers to the frame for movement transversely of the frame, gripping means for each pair of levers for engaging and retaining the billet during cutting and supporting the cutoff length thereof during movement of the frame along the track after the billet has been cut, a pneumatic cylinder having a piston rod, means pivotally connecting the cylinder to the frame for movement transversely of the frame, means connecting the piston rod to one of the pairs of levers, and means connecting the cylinder to the other pair of levers so that movement of the piston rod in one direction moves the gripping means to grip and hold the billet while movement in the other direction releases the billet, and drive means for displacing said frame along the track.

References Cited

UNITED STATES PATENTS

| 3,403,896 | 10/1968 | Mortellito et al. | 266—23 |
| 3,428,112 | 2/1969 | Cuscino | 266—23 X |
| 3,443,805 | 5/1969 | Greenberger | 266—23 |

ROBERT D. BALDWIN, Primary Examiner

U.S. Cl. X.R.

83—319